United States Patent
Palubiak (10) Patent No.: US 11,644,551 B2
(45) Date of Patent: May 9, 2023

(54) LIDAR SYSTEMS WITH IMPROVED TIME-TO-DIGITAL CONVERSION CIRCUITRY

(71) Applicant: SEMICONDUCTOR COMPONENTS INDUSTRIES, LLC, Phoenix, AZ (US)

(72) Inventor: Dariusz Piotr Palubiak, Cork (IE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 430 days.

(21) Appl. No.: 16/833,912

(22) Filed: Mar. 30, 2020

(65) Prior Publication Data

US 2021/0302553 A1  Sep. 30, 2021

(51) Int. Cl.
*G01S 7/481* (2006.01)
*G01S 7/4865* (2020.01)
*G01S 17/894* (2020.01)

(52) U.S. Cl.
CPC .......... *G01S 7/4866* (2013.01); *G01S 7/4814* (2013.01); *G01S 7/4816* (2013.01); *G01S 17/894* (2020.01)

(58) Field of Classification Search
CPC .... G01S 7/4866; G01S 7/4814; G01S 7/4816; G01S 17/894; G01S 7/4863; G01S 17/10; G01S 7/4865; G01S 7/4861
See application file for complete search history.

(56) References Cited

U.S. PATENT DOCUMENTS

| | | | |
|---|---|---|---|
| 2017/0052065 A1 | 2/2017 | Sharma et al. | |
| 2018/0164415 A1* | 6/2018 | Buckley | G01S 7/4861 |
| 2018/0209846 A1 | 7/2018 | Mandai et al. | |
| 2019/0317197 A1* | 10/2019 | Wrede | G01S 7/4861 |
| 2019/0326347 A1* | 10/2019 | Bulteel | G01S 7/487 |
| 2020/0142038 A1* | 5/2020 | Han | G05D 1/0248 |

(Continued)

OTHER PUBLICATIONS

C. Zhang, S. Lindner, I. M. Antolovic, J. Mata Pavia, M. Wolf and E. Charbon "A 30-frames/s, 252×144 SPAD Flash LiDAR With 1728 Dual-Clock 48.8-ps TDCs, and Pixel-Wise Integrated Histogramming," in IEEE Journal of Solid-State Circuits, vol. 54, No. 4, pp. 1137-1151, Apr. 2019.

(Continued)

*Primary Examiner* — Marcus H Taningco
(74) *Attorney, Agent, or Firm* — Treyz Law Group, P.C.; Tianyi He (57) ABSTRACT

A light detection and ranging (LIDAR) system may include a laser and a plurality of single photon avalanche diodes (SPADs) that are triggered by laser light that reflects off a target scene. The LIDAR system may be operated in a global shutter mode, so each of the SPADs may include its own time-to-digital conversion circuitry. To reduce the area required to implement the circuitry for each diode, the circuitry may be operated using cyclic histogramming, in which a first bit of a time-of-flight value may be determined using a first time period that corresponds to the emission of the laser light and the detection by the SPADs, a second bit of the time-of-flight value may be determined using a second time period that is half of the first time period, etc. In this way, the circuitry may accurately determine the signal peak while requiring less area and memory requirements.

19 Claims, 6 Drawing Sheets

(56) References Cited

U.S. PATENT DOCUMENTS

| | | | |
|---|---|---|---|
| 2020/0174120 A1* | 6/2020 | Steigemann | G01S 17/08 |
| 2020/0217965 A1* | 7/2020 | Calder | G01S 7/4815 |
| 2020/0233066 A1* | 7/2020 | Kulesh | G01S 7/487 |
| 2020/0284883 A1* | 9/2020 | Ferreira | G01S 7/4817 |
| 2020/0309920 A1* | 10/2020 | Beuschel | G01S 7/487 |
| 2021/0109196 A1* | 4/2021 | Beuschel | G01S 7/4865 |
| 2021/0190950 A1* | 6/2021 | McLeod | G01S 7/484 |

OTHER PUBLICATIONS

I. Vornicu, A. Darie, R. Carmona-Galan and Á. Rodriguez-Vazquez, "Compact Real-Time Inter-Frame Histogram Builder for 15-Bits High-Speed ToF-Imagers Based on Single-Photon Detection," in IEEE Sensors Journal, vol. 19, No. 6, pp. 2181-2190, Mar. 15, 2019.

* cited by examiner

LIDAR SYSTEMS WITH IMPROVED TIME-TO-DIGITAL CONVERSION CIRCUITRY

BACKGROUND

This relates generally to imaging systems, and more specifically, to LIDAR (light detection and ranging) based imaging systems.

Conventional LIDAR imaging systems illuminate a target with light (typically a coherent laser pulse) and measure the return time of reflections off the target to determine a distance to the target and light intensity to generate three-dimensional images of a scene. The LIDAR imaging systems include direct time-of-flight circuitry and lasers that illuminate a target. The time-of-flight circuitry may determine the flight time of laser pulses (e.g., having been reflected by the target), and thereby determine the distance to the target. In direct time-of-flight LIDAR systems, this distance is determined for each pixel in an array of single-photon avalanche diode (SPAD) pixels that form an image sensor.

Although direct time-of-flight techniques can be implemented using image sensors operating in rolling shutter modes, it may be difficult to implement direct time-of-flight techniques in a global shutter system. In particular, implementing dedicated time-of-flight circuitry in each SPAD pixel may require an excessive amount of area. Moreover, if the time-of-flight circuitry is shared between SPAD pixels, the frame rate may be reduced.

It would therefore be desirable to be able to provide improved time-to-digital conversion circuitry for direct time-of-flight LIDAR systems.

DETAILED DESCRIPTION

Embodiments of the present invention relate to LIDAR systems having direct time-of-flight capabilities.

Some imaging systems include image sensors that sense light by converting impinging photons into electrons or holes that are integrated (collected) in pixel photodiodes within the sensor array. After completion of an integration cycle, collected charge is converted into a voltage, which is supplied to the output terminals of the sensor. In complementary metal-oxide semiconductor (CMOS) image sensors, the charge to voltage conversion is accomplished directly in the pixels themselves and the analog pixel voltage is transferred to the output terminals through various pixel addressing and scanning schemes. The analog pixel voltage can also be later converted on-chip to a digital equivalent and processed in various ways in the digital domain.

In light detection and ranging (LIDAR) devices (such as the ones described in connection with FIGS. 1-4), on the other hand, the photon detection principle is different. LIDAR devices may include a light source, such as a laser, that emits light toward a target object/scene. The light sensing diode in the LIDAR devices may be biased slightly above its breakdown point and when an incident photon from the laser (e.g., light that has reflected off of the target object/scene) generates an electron or hole, this carrier initiates an avalanche breakdown with additional carriers being generated. The avalanche multiplication may produce a current signal that can be easily detected by readout circuitry associated with the SPAD. The avalanche process needs to be stopped (quenched) by lowering the diode bias below its breakdown point.

In LIDAR devices, the SPAD pixels may be used to measure photon time-of-flight (ToF) from a synchronized light source to a scene object point and back to the sensor, which can be used to obtain a 3-dimensional image of the scene. This method requires time-to-digital conversion circuitry to determine an amount of time that has elapsed since the laser light has been emitted and thereby determine a distance to the target object. In global shutter modes, each SPAD pixel may require its own time-to-digital conversion circuitry (e.g., to allow signals generated by each SPAD pixel to be read out at the same time). However, doing so traditionally requires more area on the pixel, or compromises are made (e.g., the frame rate is reduced) to share the circuitry. Instead, the time-to-digital conversion circuitry may be optimized to reduce the area required on the pixel by improving associated processing techniques.

Figure 1:
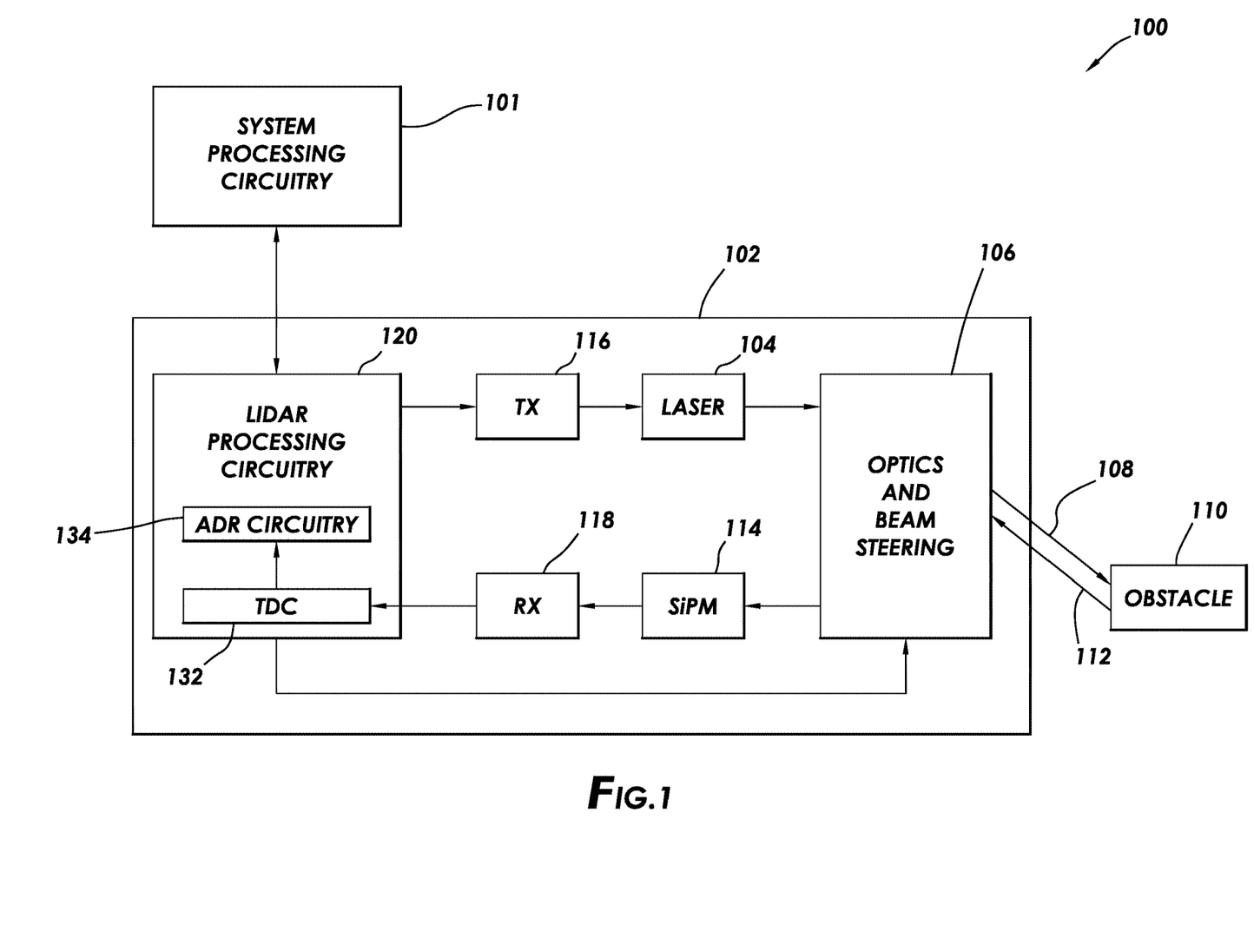
FIG. 1 is a schematic diagram of an illustrative system that includes a LIDAR imaging system.

FIG. 1 is a schematic diagram of an illustrative system that includes a LIDAR imaging system. System 100 of FIG. 1 may be vehicle safety system (e.g., an active braking system or other vehicle safety system), a surveillance system, a medical imaging system, a general machine vision system, or any other desired type of system.

System 100 includes a LIDAR-based imaging system 102, sometimes referred to as a LIDAR module. LIDAR module 102 may be used to capture images of a scene and measure distances to obstacles (also referred to as targets) in the scene.

As an example, in a vehicle safety system, information from the LIDAR module may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane-drift avoidance system), a pedestrian detection system, etc. In at least some instances, a LIDAR module may form part of a semi-autonomous or autonomous self-driving vehicle.

LIDAR module may include a laser 104 that emits light 108 to illuminate an obstacle 110 (also referred to as a target or scene herein). The laser may emit light 108 at any desired wavelength (e.g., infrared light, visible light, etc.). Optics and beam-steering equipment 106 may be used to direct the light beam from laser 104 towards obstacle 110 Light 108 may illuminate obstacle 110 and return to the LIDAR module as a reflection 112. One or more lenses in optics and beam-steering 106 may focus the reflected light 112 onto silicon photomultiplier (SiPM) 114 (sometimes referred to as SiPM sensor 114).

Silicon photomultiplier 114 is a single-photon avalanche diode (SPAD) device. In other words, silicon photomultiplier 114 may include a plurality of single-photon avalanche diodes. In single-photon avalanche diode (SPAD) devices, the light sensing diode is biased above its breakdown point. When an incident photon generates an electron or hole, this carrier initiates an avalanche breakdown with additional carriers being generated. The avalanche multiplication may produce a current signal that can be easily detected by readout circuitry associated with the SPAD. The avalanche process can be stopped (or quenched) by lowering the diode bias below its breakdown point. Each SPAD may therefore include a passive and/or active quenching circuit for halting the avalanche. The SPAD pixels may be used to measure photon time-of-flight (ToF) from a synchronized light source (e.g., laser 104) to a scene object point and back to the sensor, which can be used to obtain a 3-dimensional image of the scene.

Figures 2, 3:
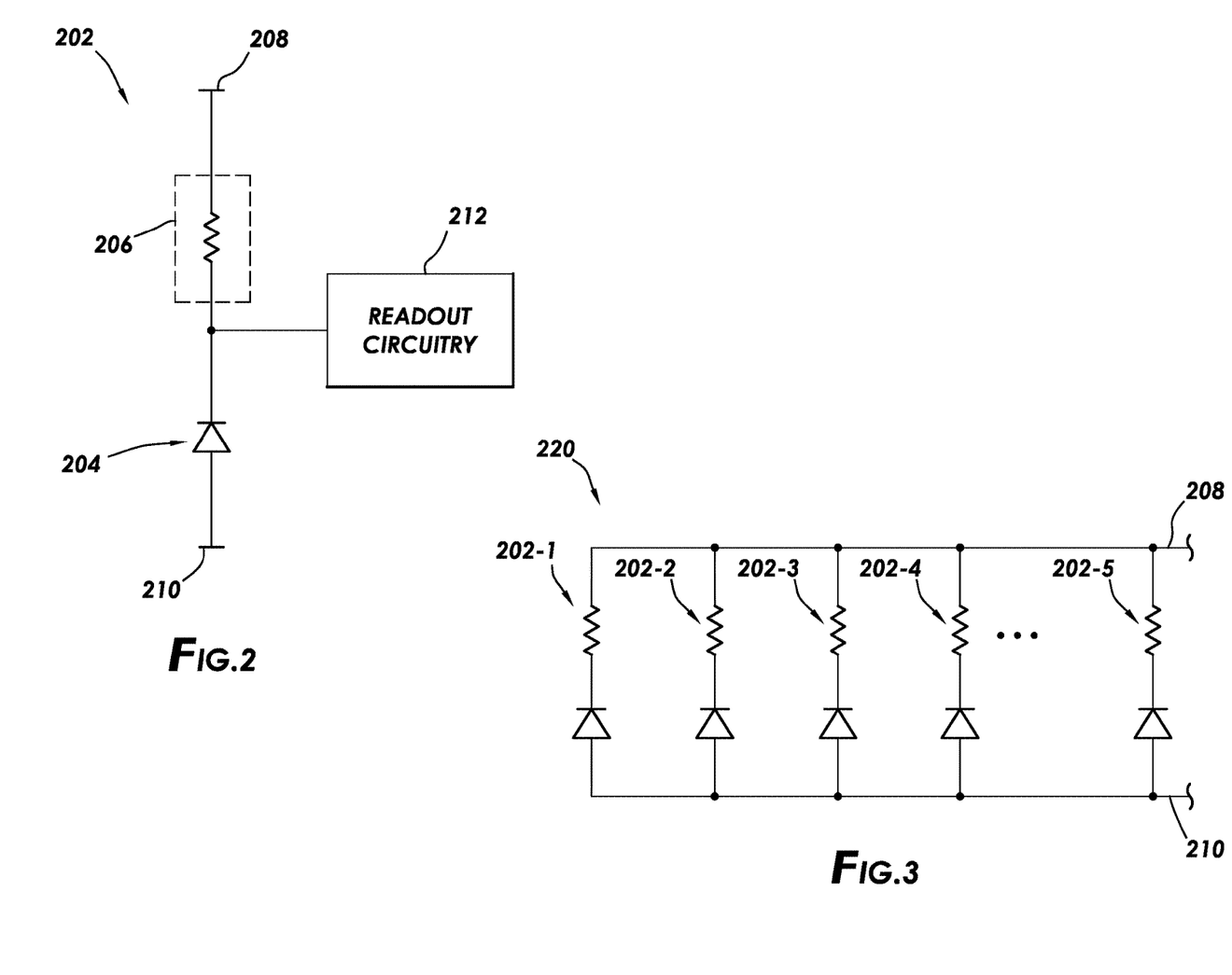
FIG. 2 is a circuit diagram showing an illustrative single-photon avalanche diode pixel in accordance with an embodiment.
FIG. 3 is a diagram of an illustrative silicon photomultiplier in accordance with an embodiment.

An example of a SPAD pixel is shown in FIG. 2. As shown in FIG. 2, SPAD device 202 includes a SPAD 204 that is coupled in series with quenching circuitry 206 between a first supply voltage terminal 208 (e.g., a ground power supply voltage terminal) and a second supply voltage terminal 210 (e.g., a positive power supply voltage terminal). During operation of SPAD device 202, supply voltage terminals 208 and 210 may be used to bias SPAD 204 to a voltage that is higher than the breakdown voltage. Breakdown voltage is the largest reverse voltage that can be applied without causing an exponential increase in the leakage current in the diode. When SPAD 204 is biased above the breakdown voltage in this manner, absorption of a single-photon can trigger a short-duration but relatively large avalanche current through impact ionization.

Quenching circuitry 206 (sometimes referred to as quenching element 206) may be used to lower the bias voltage of SPAD 204 below the level of the breakdown voltage. Lowering the bias voltage of SPAD 204 below the breakdown voltage stops the avalanche process and corresponding avalanche current. There are numerous ways to form quenching circuitry 206. Quenching circuitry 206 may be passive quenching circuitry or active quenching circuitry. Passive quenching circuitry may automatically quench the avalanche current without external control or monitoring once initiated. For example, FIG. 2 shows an example where a resistor is used to form quenching circuitry 206. This is an example of passive quenching circuitry. After the avalanche is initiated, the resulting current rapidly discharges the capacity of the device, lowering the voltage at the SPAD to near to the breakdown voltage. The resistance associated with the resistor in quenching circuitry 206 may result in the final current being lower than required to sustain itself. The SPAD may then be reset to above the breakdown voltage to enable detection of another photon.

This example of passive quenching circuitry is merely illustrative. Active quenching circuitry may also be used in SPAD device 202. Active quenching circuitry may reduce the time it takes for SPAD device 202 to be reset. This may allow SPAD device 202 to detect incident light at a faster rate than when passive quenching circuitry is used, improving the dynamic range of the SPAD device. Active quenching circuitry may modulate the SPAD quench resistance. For example, before a photon is detected, quench resistance is set high and then once a photon is detected and the avalanche is quenched, quench resistance is minimized to reduce recovery time.

SPAD device 202 may also include readout circuitry 212. There are numerous ways to form readout circuitry 212 to obtain information from SPAD device 202. Readout circuitry 212 may include a pulse counting circuit that counts arriving photons. Alternatively or in addition, readout circuitry 212 may include time-of-flight circuitry that is used to measure photon time-of-flight (ToF). The photon time-of-flight information may be used to perform depth sensing.

In one example, photons may be counted by an analog counter to form the light intensity signal as a corresponding pixel voltage. The ToF signal may be obtained by also converting the time of photon flight to a voltage. The example of an analog pulse counting circuit being included in readout circuitry 212 is merely illustrative. If desired, readout circuitry 212 may include digital pulse counting circuits. Readout circuitry 212 may also include amplification circuitry if desired.

The example in FIG. 2 of readout circuitry 212 being coupled to a node between diode 204 and quenching circuitry 206 is merely illustrative. Readout circuitry 212 may be coupled to any desired portion of the SPAD device. In some cases, quenching circuitry 206 may be considered integral with readout circuitry 212.

Because SPAD devices can detect a single incident photon, the SPAD devices are effective at imaging scenes with low light levels. Each SPAD may detect how many photons are received within a given period of time (e.g., using readout circuitry that includes a counting circuit). However, as discussed above, each time a photon is received and an avalanche current initiated, the SPAD device must be quenched and reset before being ready to detect another photon. As incident light levels increase, the reset time becomes limiting to the dynamic range of the SPAD device (e.g., once incident light levels exceed a given level, the SPAD device is triggered immediately upon being reset). Moreover, the SPAD devices may be used in a LIDAR system to determine when light has returned after being reflected from an external object.

Multiple SPAD devices may be grouped together to help increase dynamic range. The group or array of SPAD devices may be referred to as a silicon photomultiplier (SiPM). Two SPAD devices, more than two SPAD devices, more than ten SPAD devices, more than one hundred SPAD devices, more than one thousand SPAD devices, etc. may be included in a given silicon photomultiplier. An example of multiple SPAD devices grouped together is shown in FIG. 3.

FIG. 3 is a circuit diagram of an illustrative group 220 of SPAD devices 202. The group of SPAD devices may be referred to as a silicon photomultiplier (SiPM). As shown in FIG. 3 silicon photomultiplier 220 may include multiple SPAD devices that are coupled in parallel between first supply voltage terminal 208 and second supply voltage terminal 210. FIG. 3 shows N SPAD devices 202 coupled in parallel (e.g., SPAD device 202-1, SPAD device 202-2, SPAD device 202-3, SPAD device 202-4, . . . , SPAD device 202-N). More than two SPAD devices, more than ten SPAD devices, more than one hundred SPAD devices, more than one thousand SPAD devices, etc. may be included in a given silicon photomultiplier.

Herein, each SPAD device may be referred to as a SPAD pixel 202. Although not shown explicitly in FIG. 3, readout circuitry for the silicon photomultiplier may measure the combined output current from all of SPAD pixels in the silicon photomultiplier. In this way, the dynamic range of an imaging system including the SPAD pixels may be increased. However, if desired, each SPAD pixel may have individual readout circuitry. Each SPAD pixel is not guaranteed to have an avalanche current triggered when an incident photon is received. The SPAD pixels may have an associated probability of an avalanche current being triggered when an incident photon is received. There is a first probability of an electron being created when a photon reaches the diode and then a second probability of the electron triggering an avalanche current. The total probability of a photon triggering an avalanche current may be referred to as the SPAD's photon-detection efficiency (PDE). Grouping multiple SPAD pixels together in the silicon photomultiplier therefore allows for a more accurate measurement of the incoming incident light. For example, if a single SPAD pixel has a PDE of 50% and receives one photon during a time period, there is a 50% chance the photon will not be detected. With the silicon photomultiplier 220 of FIG. 3, chances are that two of the four SPAD pixels will detect the photon, thus improving the provided image data for the time period and allowing for a more accurate measurement of the incoming light.

The example of a plurality of SPAD pixels having a common output in a silicon photomultiplier is merely illustrative. In the case of an imaging system including a silicon photomultiplier having a common output for all of the SPAD pixels, the imaging system may not have any resolution in imaging a scene (e.g., the silicon photomultiplier can just detect photon flux at a single point). It may be desirable to use SPAD pixels to obtain image data across an array to allow a higher resolution reproduction of the imaged scene. In cases such as these, SPAD pixels in a single imaging system may have per-pixel readout capabilities. Alternatively, an array of silicon photomultipliers (each including more than one SPAD pixel) may be included in the imaging system. The outputs from each pixel or from each silicon photomultiplier may be used to generate image data for an imaged scene. The array may be capable of independent detection (whether using a single SPAD pixel or a plurality of SPAD pixels in a silicon photomultiplier) in a line array (e.g., an array having a single row and multiple columns or a single column and multiple rows) or an array having more than ten, more than one hundred, or more than one thousand rows and/or columns.

Returning to FIG. 1, LIDAR module 102 may also include a transmitter 116 and receiver 118. LIDAR processing circuitry 120 may control transmitter 116 and laser 104. The LIDAR processing circuitry 120 may also receive data from receiver 118 (and SiPM 114). Based on the data from SiPM 114, LIDAR processing circuitry 120 may determine a distance to the obstacle 110. The LIDAR processing circuitry 120 may communicate with system processing circuitry 101. System processing circuitry 101 may take corresponding action (e.g., on a system-level) based on the information from LIDAR module 102.

LIDAR processing circuitry 120 may include time-to-digital converter (TDC) circuitry 132 and autonomous dynamic resolution circuitry 134. The time-to-digital converter circuitry 132 may use time values (e.g., between the laser emitting light and the reflection being received by SiPM 114) to obtain a digital value representative of the distance to the obstacle 110.

The readout for direct time-of-flight (ToF) LIDAR is achieved using multiple LASER cycles to create a histogram in memory based on the time-stamps generated by a SPAD and time-to-digital converter (TDC). The peak of the histogram is used to determine the time taken for the LASER signal to travel to the target and return to the sensor. However, generating a histogram of all of the time-stamps may require a very large memory and too large of an area to be compatible with global shutter operations. Moreover, attempts at generating partial histograms still require a large TDC, are a waste of power, and are susceptible to border errors. Therefore, improved TDC circuitry and histogram generation is desired.

Figure 4:
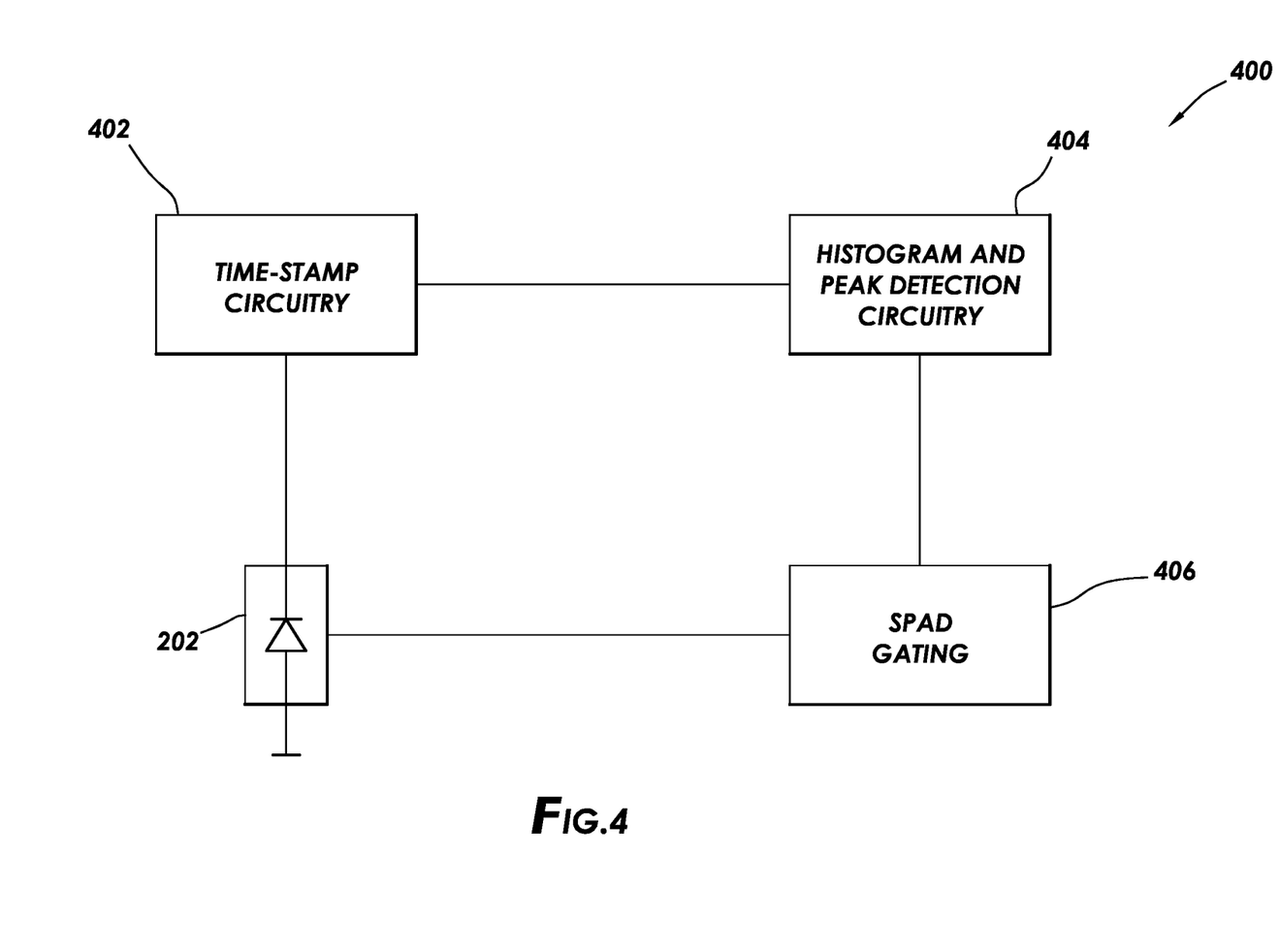
FIG. 4 is a diagram of illustrative processing circuitry associated with a SPAD pixel of a LIDAR system in accordance with an embodiment.

As shown in FIG. 4, each SPAD pixel 202 (or SiPM 114) may be associated with TDC circuitry 400 that generates histograms in response to the charge detected by the SPAD pixel. SPAD pixel 202 (or SiPM 114) may be coupled to time-stamp circuitry 402. Time-stamp 402 may generate time-stamp information each time a laser pulse is generated by LIDAR module 102, such as with laser 104, and each time the SPAD pixel or SiPM is triggered in response to a photon. After the emission and detection of light has been time-stamped, the data may be passed to histogram and peak detection circuitry 404. Histogram and peak detection circuitry 404 may be used to determine where a peak has occurred within the time-stamped information (e.g., where a SPAD pixel/SiPM has been triggered most within a given period of time). Histogram circuitry 404 may utilize a cyclic histogramming method, in which the data from the SPAD pixel is iteratively analyzed using smaller time periods based on relative peaks in the data. In particular, the cyclic histogramming method may allow for reduced memory, size, and power requirements, as well as increased robustness to border errors.

SPAD gating 406 may be coupled between histogram and peak detection circuitry 404 and SPAD pixel 202. In particular, SPAD gating 406 may be adjusted to change the time period analyzed in response to feedback from histogram and peak detection circuitry 404. For example, if histogram and peak detection circuitry 404 determines that a peak has occurred in the first half of the analyzed time period during a first cycle of the cyclic histogramming, SPAD gating 406 may be adjusted to collect light samples during only a new time period that corresponds with the first half of the previous time period in the next cycle. This may be repeated iteratively with cyclic histogramming until the peak is found with the desired significance. As previously discussed, this method may reduce the memory, size, and power requirements of circuitry 400. Therefore, each SPAD pixel may have dedicated circuitry 400, which may allow the LIDAR system to operate in a global shutter mode. However, this is merely illustrative. In general, circuitry 400 and/or the cyclic histogramming scheme may be implemented in a LIDAR system operating in a rolling shutter mode, if desired.

Figure 5:
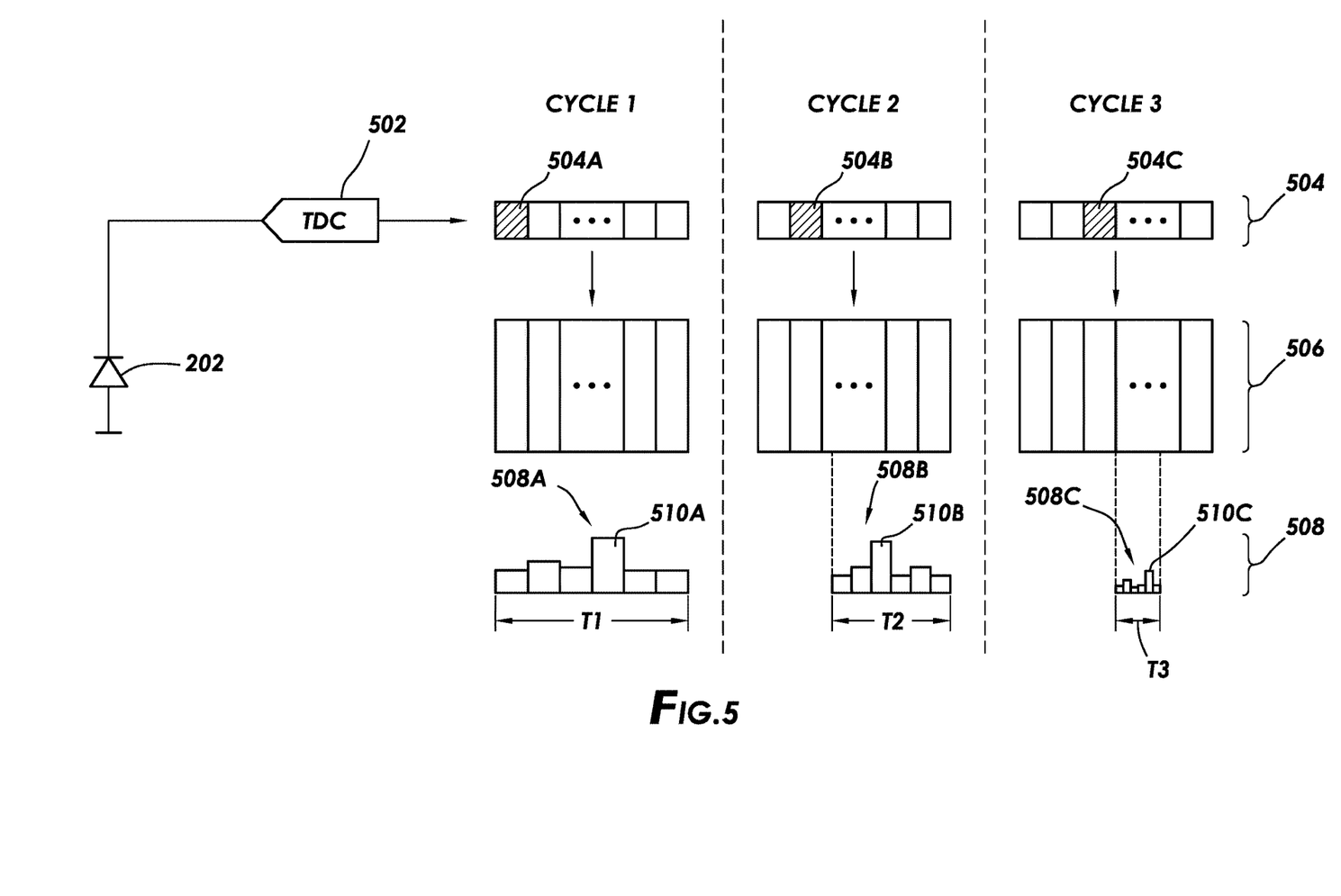
FIG. 5 is a diagram of an illustrative process of performing cyclic histogramming in accordance with an embodiment.

An example of the cyclic histogramming process is shown in FIG. 5. As shown in FIG. 5, SPAD pixel 202 (or SiPM) may be coupled to TDC 502 (which may correspond to TDC circuitry 400 of FIG. 4). Together, SPAD pixel 202 and TDC 502 may generate time-stamped signals in response to laser light that has been reflected by external objects. In particular, SPAD pixel 202 and TDC 502 may generate multiple cycles of time-stamped signals. In each cycle, a portion of time-stamped data 504 may be stored in memory 506. In response to the data, histogram 508 may be produced, in which a peak may be determined.

Cycle 1 may analyze first bit 504A of time-stamped data 504. First bit 504A may be the most significant bit (i.e., the coarsest bit) of time-stamped data 504. In particular, the data associated with first bit 504A may be stored in memory 506. Histogram 508A may be produced in response to the data stored in memory 506. In particular, histogram 508A may be used to determine that a peak over time period T1 occurs at position 510A. Time period T1 may correspond to the amount of time of needed for laser emission and detection and may be less than 100 ns, less than 50 ns, less than 45 ns, more than 30 ns, or any other desired length of time. Because the peak occurs in the second half of time period T1, Cycle 2 may focus on a new time period T2 that is equal to the second half of time period T1. Additionally, the processing circuitry may determine that the value of the most significant bit (MSB) of the time-of-flight value is 1 (it would be 0 if the peak fell in the first half of the time period). The MSB of the time-of-flight value may be the coarsest bit of the time-of-flight value.

In Cycle 2, the laser may emit light and the SPAD pixel may detect reflected light during a new time period T2, which is half the time period of T1 (e.g., the time period that corresponds with the second half of original time period T1). Signals generated by the SPAD pixel may be stored as second bit 504B of time-stamped data 504 in memory 506. Second bit 504B may be the second coarsest bit of time-stamped data 504 relative to the most significant bit. Second bit 504B may be analyzed similarly to what was discussed above in Cycle 1. In particular, the signals of second bit 504B may be plotted on a histogram that corresponds with the new time period T2. As shown, peak 510B of histogram 508B occurs in the first half of time period T2. Because the peak occurs in the first half of time period T2, Cycle 3 may focus on a new time period T3 that is equal to the first half of time period T2. Additionally, the processing circuitry may determine that the value of the next bit relative to the MSB (e.g., the second coarsest bit relative to the MSB) is 0 (it would be 1 if the peak fell in the second half of the time period).

In Cycle 3, the process may be repeated for third bit 504C. Third bit 504C may be the third coarsest bit of time-stamped data 504 relative to the most significant bit. As shown, peak 510C in histogram 508C occurs in the second half of time period T3. Therefore, the next Cycle (if any) may focus on a new time period that is equal to the second half of time period T3, and the processing circuitry may determine that the value of the next bit relative to the MSB (e.g., the third coarsest bit relative to the MSB) is 1. This process may be continued iteratively for as many bits are desired, or at least for as much significance is desired. For example, three or more, four or more, five or more, less than ten, or more than 6 cycles may be performed to produce time-of-flight data of 6 bits, more than 4 bits, or less than 64 bits, as examples. In some examples, the final cycle may produce more than one bit, more than two bits, less than six bits, or any other desired number of bits of the time-of-flight value. The final cycle may produce the least significant bit (LSB) of the time-of-flight value. The LSB of the time-of-flight value may be the finest (e.g., least coarse) bit of the time-of-flight value. In general, any desired number of cycles may be used to determine the time-of-flight data to any desired significance value. Although FIG. 5 has illustrated the peaks in different positions, this is merely illustrative. In general, the location of the peaks in each histogram will vary based on the scene being imaged by the LIDAR system. Illustrative circuitry that may be used to perform cyclic histogramming is shown in FIG. 6.

Figure 6:
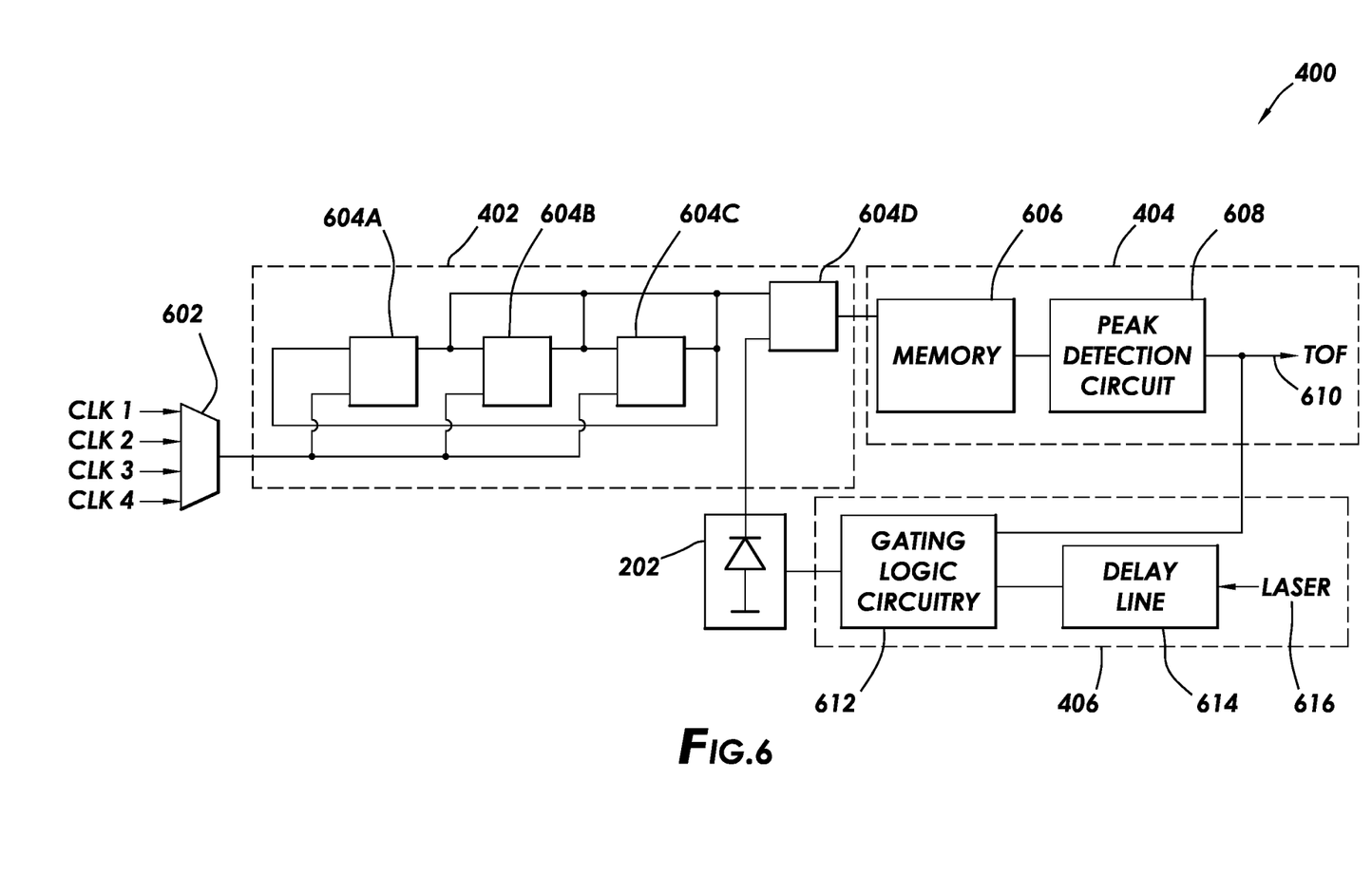
FIG. 6 is a diagram of illustrative time-stamping circuitry, histogram and peak detection circuitry, and gating logic circuitry associated with a SPAD pixel of a LIDAR system in accordance with an embodiment.

As shown in FIG. 6, TDC circuitry 400 may include SPAD pixel 202, time-stamp circuitry 402, histogram and peak detection circuitry 404, and logic gating 406. These portions may be the same as described above in connection with FIG. 4, with the details of shown in FIG. 6. SPAD pixel 202 may be coupled to time-stamp circuitry 402, which may include a counter that includes delay flip-flops (DFFs) 604A, 604B, and 604C. The counter may receive clock signals CLK1, CLK2, CLK3, and CLK4 from multiplexer 602. DFF 604D may be coupled to the counter and to SPAD pixel 202 and output to histogram and peak detection circuitry 404.

Histogram and peak detection circuitry 404 may include memory 606 and peak detect circuit 608. Memory 606 may temporarily store the time-stamped information generated by SPAD pixel 202 and time-stamp circuitry 402 (e.g., may store the information during the cyclic histogramming process described in connection with FIG. 5). Following the multiple cycles involved with the histogramming process, the determined time-of-flight value (TOF) may be output over line 610. After each individual cycle (e.g., prior to the final cycle), the output of peak detect circuit 608 may be passed to logic gating 404.

Logic gating 404 may include gating logic circuitry 612, which may receive the output of peak detect circuit 608 and information regarding the laser input 616 (e.g., so that the correct timing can be attributed to the emission of the laser light) through delay line 614. Gating logic circuitry 612 may adjust the time period in which SPAD pixel 202 collects light in response to the output of peak detect circuit (e.g., gating logic circuitry 612 may mask half of the previous time period to form the new time period that the circuitry will analyze, as described in connection with FIG. 5). In addition to the reduced time period in which light is collected by SPAD pixel 202, the clock signal may be selected to have a higher frequency (e.g., CLK2 may be used for Cycle 2 and may have a higher frequency than CLK1 used for Cycle 1). For example, the clock signal used for any given Cycle may have double the frequency (to correspond to the halved time period) as compared to the previous Cycle. In other words, the time period of any given Cycle may have double the resolution as compared to the previous Cycle. In this way, TDC circuitry 400 may provide for coarse measurements initially, followed by finer measurements in subsequent Cycles, which may allow for reduced power consumption by the TDC in addition to the area and accuracy benefits previously discussed.

In the embodiment of FIG. 6, circuitry 400 is configured to have four cycles of histogramming, as shown by the structure of time-stamping circuitry 402. However, this, as well as the other portions of circuitry 400, is merely illustrative. In general, circuitry 400 may have any desired architecture in order to perform cyclic histogramming processes of any desired number of cycles. A method of operating circuitry 400 of FIGS. 4 and 6 is shown in FIG. 7.

Figure 7:
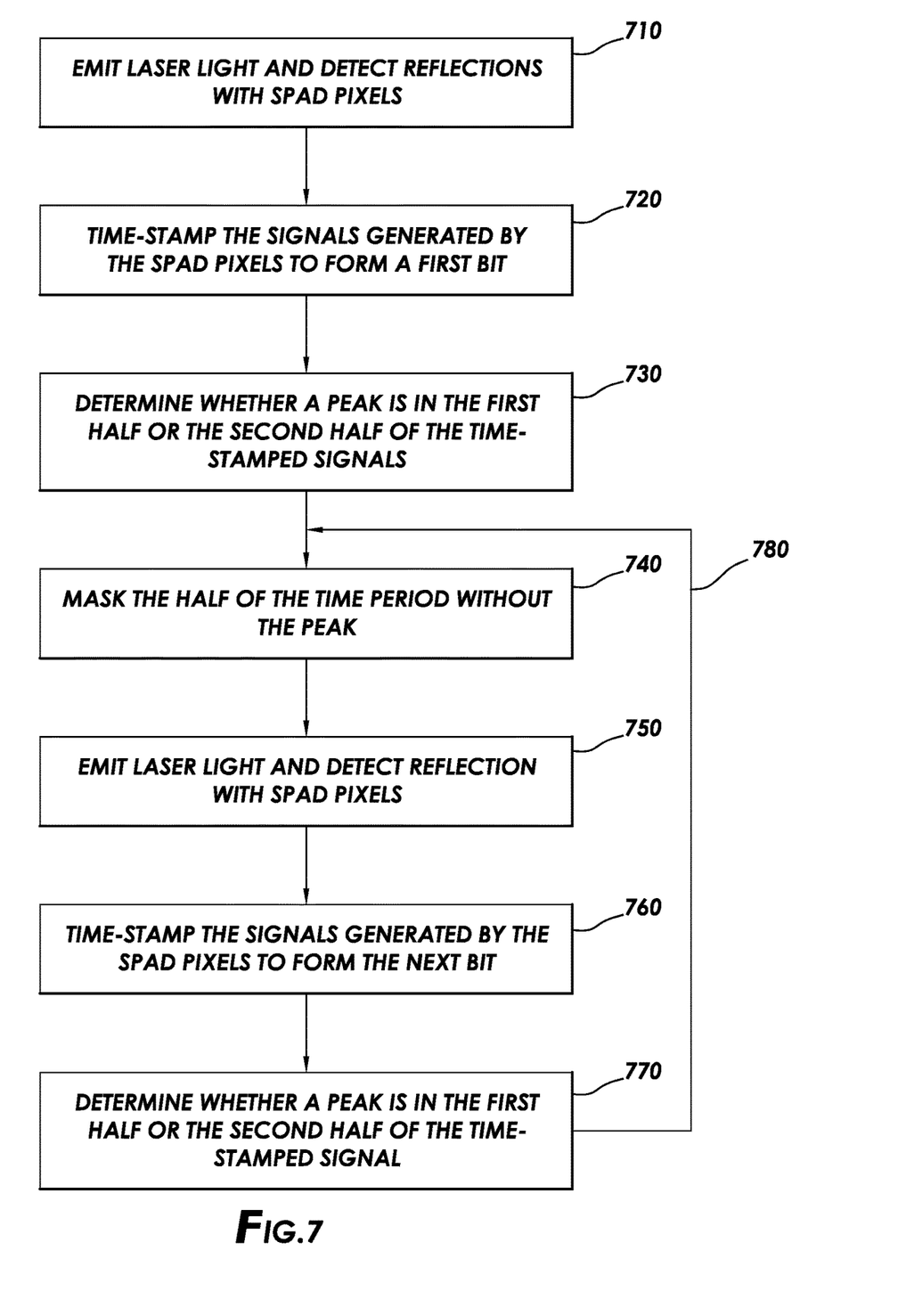
FIG. 7 is a flowchart of an illustrative method of operating a LIDAR system using cyclic histogramming operations in accordance with an embodiment.

As shown in FIG. 7, at step 710, the LIDAR system may emit laser light, and a SPAD pixel or SiPM may be triggered in response to the reflection of the laser light. In particular, in an SiPM, some of the SPADs may be triggered by the reflected light, while some may not be triggered. The number of SPADs that are triggered by the reflected light in any given area may be converted to signals that reflect the light distance at various portions of the scene being analyzed.

At step 720, time-stamp circuitry may time-stamp the signals generated by the SPADs to form a first bit of information. The first bit of information may be the most significant bit of information and be the coarsest bit generated by the SPADs and the time-stamp circuitry.

At step 730, the time-stamped signals may be histogrammed by the histogram circuitry to determine whether a peak is in the first half of the time period or in the second half of the time period. The circuitry may assign the most significant bit (also referred to as a first bit herein) of the time-of-flight a value of 0 if the peak is in the first half of the time period, or a value of 1 if the peak is in the second half of the time period.

At step 740, the gate logic circuitry may mask the half of the time period without the signal peak. In other words, the gate logic circuitry may be configured to analyze only the time period with the signal peak, which may allow the circuitry to determine the location of the peak with additional confidence.

At step 750, the LIDAR system may emit laser light, and a SPAD pixel or SiPM may be triggered in response to the reflection of the laser light. In particular, in an SiPM, some of the SPADs may be triggered by the reflected light, while some may not be triggered. The number of SPADs that are triggered by the reflected light in any given area may be converted to signals that reflect the light distance at various portions of the scene being analyzed.

At step 760, the time-stamp circuitry may time-stamp the signals generated by the SPADs to form the next bit of information (e.g., the next coarsest bit of information relative to the most significant bit of information). Because the time period for the laser emission and SPAD detection is half of the previous time period, the frequency (and therefore the resolution) may be increased, allowing for finer time-stamp information to be included in the signals.

At step 770, the time-stamped signals may be histogrammed by the histogram circuitry to determine whether a peak is in the first half of the time period or in the second half of the time period. The circuitry may assign the next coarsest bit of the time-of-flight (relative to the most significant bit) a value of 0 if the peak is in the first half of the time period, or a value of 1 if the peak is in the second half of the time period.

This process may be repeated, as shown by line 780, for any number of desired cycles, such as four cycles, five cycles, more than three cycles, or any other desired number of cycles. After the desired number of cycles have been performed, the time-of-flight value may be read out from the circuitry.

In any of the aforementioned embodiments, it should be understood that a silicon photomultiplier (with multiple SPAD pixels having a common output) may be used in place of a single SPAD pixel.

In various embodiments of the present invention, a light detection and ranging device may include a single photon avalanche diode, time-stamp circuitry coupled to the single photon avalanche diode, histogram and peak detection circuitry coupled to the time-stamp circuitry, and gating logic circuitry coupled between the histogram and peak detection circuitry and the single photon avalanche diode. The histogram and peak detection circuitry may be configured to perform cyclic histogramming on time-stamped signals generated by the single photon avalanche diode and the time-stamp circuitry In accordance with an embodiment, the time-stamp circuitry may include a counter that has at least three delay flip-flops.

In accordance with an embodiment, the time-stamp circuitry may be configured to define a first time period for the time-stamped signals and wherein the histogram and peak detection circuitry is configured to determine whether a peak of the time-stamped signals occurs in a first half of the first time period or in a second half of the second time period.

In accordance with an embodiment, the gating logic circuitry may be configured to mask half of the first time period based on the location of the peak to define a second time period.

In accordance with an embodiment, the histogram and peak detection circuitry may include memory and a peak detection circuit, wherein the memory is interposed between the peak detection circuit and the time-stamp circuitry.

In accordance with an embodiment, the peak detection circuitry may be configured to output a time-of-flight value over an output line following completion of the cyclic histogramming.

In accordance with an embodiment, light detection and ranging device may further include a laser signal input coupled to the gating logic circuitry through a delay line, wherein the time-stamp circuitry may be configured to time-stamp the signals produced by the single photon avalanche diode based on the laser signal input.

In accordance with an embodiment, the histogram and peak detection circuitry may be configured to perform at least three cycles of cyclic histogramming prior to outputting the time-of-flight value over the output line.

In accordance with various embodiments, a method of operating a light detection and ranging device may include performing a first cycle of cyclic histogramming, and performing a second cycle of cyclic histogramming. Performing the first cycle of cyclic histogramming may include emitting laser light and detecting reflections of the laser light using single photon avalanche diode pixels, time-stamping signals generated by the single photon avalanche diode pixels to form a first bit corresponding to a first time period, and determining whether a peak of the time-stamped signals is in a first half of the first time period or a second half of the first time period. Performing the second cycle of cyclic histogramming may include masking the half of the first time period without the peak of the time-stamped signals to define a second time period.

In accordance with an embodiment, performing the second cycle of cyclic histogramming may further include emitting laser light and detecting additional reflections of the laser light using the single photon avalanche diode pixels, time-stamping additional signals generated by the single photon avalanche diode pixels to form a second bit corresponding to the second time period, and determining whether a peak of the additional time-stamped signals is in a first half of the second time period or a second half of the second time period. The second time period may have double the resolution of the first time period.

In accordance with an embodiment, determining whether the peak of the time-stamped signals is in the first half of the first time period or the second half of the first time period may include assigning a value of zero to the most significant bit of a time-of-flight value if the peak is in the first half and assigning a value of one to the most significant bit if the peak is in the second half.

In accordance with an embodiment, performing the second cycle of cyclic histogramming may include assigning a value to a second coarsest bit (relative to the most significant bit) of the time-of-flight value, and the method may further include performing a third cycle of cyclic histogramming to assign a third coarsest bit (relative to the most significant bit) to the time-of-flight value, and performing a fourth cycle of cyclic histogramming to assign at least a fourth coarsest bit (relative to the most significant bit) to the time-of-flight value.

In accordance with an embodiment, the method may further include, after performing the fourth cycle of cyclic histogramming, reading out the time-of-flight value over an output line.

In accordance with an embodiment, time-stamping signals generated by the single photon avalanche diode pixels to form a first bit corresponding to the first time period may include forming the first bit corresponding to a length of time of less than 50 ns.

In accordance with an embodiment, performing the fourth cycle of cyclic histogramming to assign at least the fourth bit to the time-of-flight value may include assigning the fourth coarsest bit relative to the most significant bit, a fifth coarsest bit relative to the most significant bit, and a sixth coarsest bit relative to the most significant bit (also referred to herein as the least significant bit) to the time-of-flight value, and wherein reading out the time-of-flight value over the output line may include reading out a six-bit time-of-flight value.

In accordance with various embodiment, a light detection and ranging device may include a single photon avalanche diode configured to generate signals in response to light, a laser, gating logic circuitry coupled between the single photon avalanche diode and the laser, wherein the gating logic circuitry is configured to activate the single photon avalanche diode in response to an emission by the laser, time-stamp circuitry coupled to the single photon avalanche diode and configured to time-stamp the signals generated by the single photon avalanche diode with a time period, and histogram and peak detection circuitry coupled between the time-stamp circuitry and the gating logic circuitry, wherein the histogram and peak detection circuitry is configured to determine whether a peak of the signals occurs in a first half of the time period or in a second half of the time period and to generate a bit of a time-of-flight value based on whether the peak occurs in the first half or in the second half of the time period.

In accordance with an embodiment, the histogram and peak detection circuitry may be configured to assign a value of zero to the bit of the time-of-flight value if the peak occurs in the first half of the time period and wherein the histogram and peak detection circuitry may be configured to assign a value of one to the bit of the time-of-flight value if the peak occurs in the second half of the time period.

In accordance with an embodiment, the gating logic circuitry may be configured to mask half of the time period to produce an additional time period, wherein the laser may be configured to emit additional light during the additional time period, wherein the single photon avalanche diode may be configured additional signals in response to reflections of the additional light, and wherein the histogram and peak detection circuitry may be configured to generate an additional bit of the time-of-flight value based on a peak of the additional signals.

In accordance with an embodiment, the histogram and peak detection circuitry may be configured to perform at least four cycles of cyclic histogramming to produce a time-of-flight value of at least six bits.

In accordance with an embodiment, the first time period may be less than 50 ns and wherein the additional time period may be half of the first time period.

The foregoing is merely illustrative of the principles of this invention and various modifications can be made by those skilled in the art. The foregoing embodiments may be implemented individually or in any combination.

What is claimed is:

1. A light detection and ranging device comprising:
    a plurality of single photon avalanche diodes;
    time-stamp circuitry coupled to a single one of the plurality of single photon avalanche diodes, wherein the time-stamp circuitry is configured to define a time period of time-stamped signals;
    histogram and peak detection circuitry coupled to the time-stamp circuitry, wherein the histogram and peak detection circuitry is configured to perform cyclic histogramming on the time-stamped signals generated by the single one of the plurality of single photon avalanche diodes and the time-stamp circuitry, and wherein the histogram and peak detection circuitry is configured to determine whether a peak of the time-stamped signals occurs in a first portion of the time period or in a second portion of the time period; and
    gating logic circuitry coupled between the histogram and peak detection circuitry and the single one of the single photon avalanche diodes.

2. The light detection and ranging device defined in claim 1 wherein the time-stamp circuitry comprises a counter that has at least three delay flip-flops.

3. The light detection and ranging device defined in claim 2 wherein the time period of time-stamped signals is a first time period, and wherein the gating logic circuitry is configured to mask half of the first time period based on the location of the peak to define a second time period.

4. The light detection and ranging device defined in claim 3 wherein the histogram and peak detection circuitry comprises memory and a peak detection circuit, wherein the memory is interposed between the peak detection circuit and the time-stamp circuitry.

5. The light detection and ranging device defined in claim 4 wherein the histogram and peak detection circuitry is configured to output a time-of-flight value over an output line following completion of the cyclic histogramming.

6. The light detection and ranging device defined in claim 5 further comprising a laser signal input coupled to the gating logic circuitry through a delay line, wherein the time-stamp circuitry is configured to time-stamp the signals produced by the single one of the single photon avalanche diodes based on the laser signal input.

7. The light detection and ranging device defined in claim 6 wherein the histogram and peak detection circuitry is configured to perform at least three cycles of cyclic histogramming prior to outputting the time-of-flight value over the output line.

8. A method of operating a light detection and ranging device, the method comprising:
    performing a first cycle of cyclic histogramming, comprising:
        emitting laser light and detecting reflections of the laser light using single photon avalanche diode pixels,
        time-stamping signals generated by the single photon avalanche diode pixels to form a first bit corresponding to a first time period, and
        determining whether a peak of the time-stamped signals is in a first half of the first time period or a second half of the first time period; and
    performing a second cycle of cyclic histogramming, comprising:
        masking the half of the first time period without the peak of the time-stamped signals to define a second time period.

9. The method defined in claim 8 wherein performing the second cycle of cyclic histogramming further comprises:
    emitting laser light and detecting additional reflections of the laser light using the single photon avalanche diode pixels;
    time-stamping additional signals generated by the single photon avalanche diode pixels to form a second bit corresponding to the second time period, wherein the second time period has double the resolution of the first time period; and determining whether a peak of the additional time-stamped signals is in a first half of the second time period or a second half of the second time period.

10. The method defined in claim 9 wherein determining whether the peak of the time-stamped signals is in the first half of the first time period or the second half of the first time period comprises assigning a value of zero to a most significant bit of a time-of-flight value if the peak is in the first half of the first time period and assigning a value of one to the most significant bit if the peak is in the second half of the first time period.

11. The method defined in claim 10 wherein performing the second cycle of cyclic histogramming comprises assigning a value to a second coarsest bit of the time-of-flight value relative to the most significant bit, the method further comprising:

performing a third cycle of cyclic histogramming to assign a third coarsest bit to the time-of-flight value relative to the most significant bit; and performing a fourth cycle of cyclic histogramming to assign at least a fourth coarsest bit to the time-of-flight value relative to the most significant bit.

12. The method defined in claim 11 further comprising:

after performing the fourth cycle of cyclic histogramming, reading out the time-of-flight value over an output line.

13. The method defined in claim 12 wherein time-stamping signals generated by the single photon avalanche diode pixels to form a first bit corresponding to the first time period comprises forming the first bit corresponding to a length of time of less than 50 ns.

14. The method defined in claim 13 wherein performing the fourth cycle of cyclic histogramming to assign at least the fourth coarsest bit to the time-of-flight value comprises assigning the fourth coarsest bit, a fifth coarsest bit relative to the most significant bit, and a sixth coarsest bit relative to the most significant bit to the time-of-flight value, and wherein reading out the time-of-flight value over the output line comprises reading out a six-bit time-of-flight value.

15. A light detection and ranging device comprising:

a single photon avalanche diode configured to generate signals in response to light;

a laser;

gating logic circuitry coupled between the single photon avalanche diode and the laser, wherein the gating logic circuitry is configured to activate the single photon avalanche diode in response to an emission by the laser;

time-stamp circuitry coupled to the single photon avalanche diode and configured to time-stamp the signals generated by the single photon avalanche diode with a time period; and histogram and peak detection circuitry coupled between the time-stamp circuitry and the gating logic circuitry, wherein the histogram and peak detection circuitry is configured to determine whether a peak of the signals occurs in a first half of the time period or in a second half of the time period.

16. The light detection and ranging device defined in claim 15 wherein the histogram and peak detection circuitry is further configured to generate a bit of a time-of-flight value based on whether the peak occurs in the first half or in the second half of the time period, to assign a value of zero to the bit of the time-of-flight value if the peak occurs in the first half of the time period, and to assign a value of one to the bit of the time-of-flight value if the peak occurs in the second half of the time period.

17. The light detection and ranging device defined in claim 16 wherein the gating logic circuitry is configured to mask half of the time period to produce an additional time period, wherein the laser is configured to emit additional light during the additional time period, wherein the single photon avalanche diode is configured additional signals in response to reflections of the additional light, and wherein the histogram and peak detection circuitry is configured to generate an additional bit of the time-of-flight value based on a peak of the additional signals.

18. The light detection and ranging device defined in claim 17 wherein the histogram and peak detection circuitry is configured to perform at least four cycles of cyclic histogramming to produce a time-of-flight value of at least six bits.

19. The light detection and ranging device defined in claim 18 wherein the first time period is less than 50 ns and wherein the additional time period is half of the first time period.

* * * * *